Sept. 18, 1934.                S. G. PLUMMER                1,973,929
                              DREDGER PIPE VALVE
                        Filed Sept. 16, 1931      3 Sheets-Sheet 3

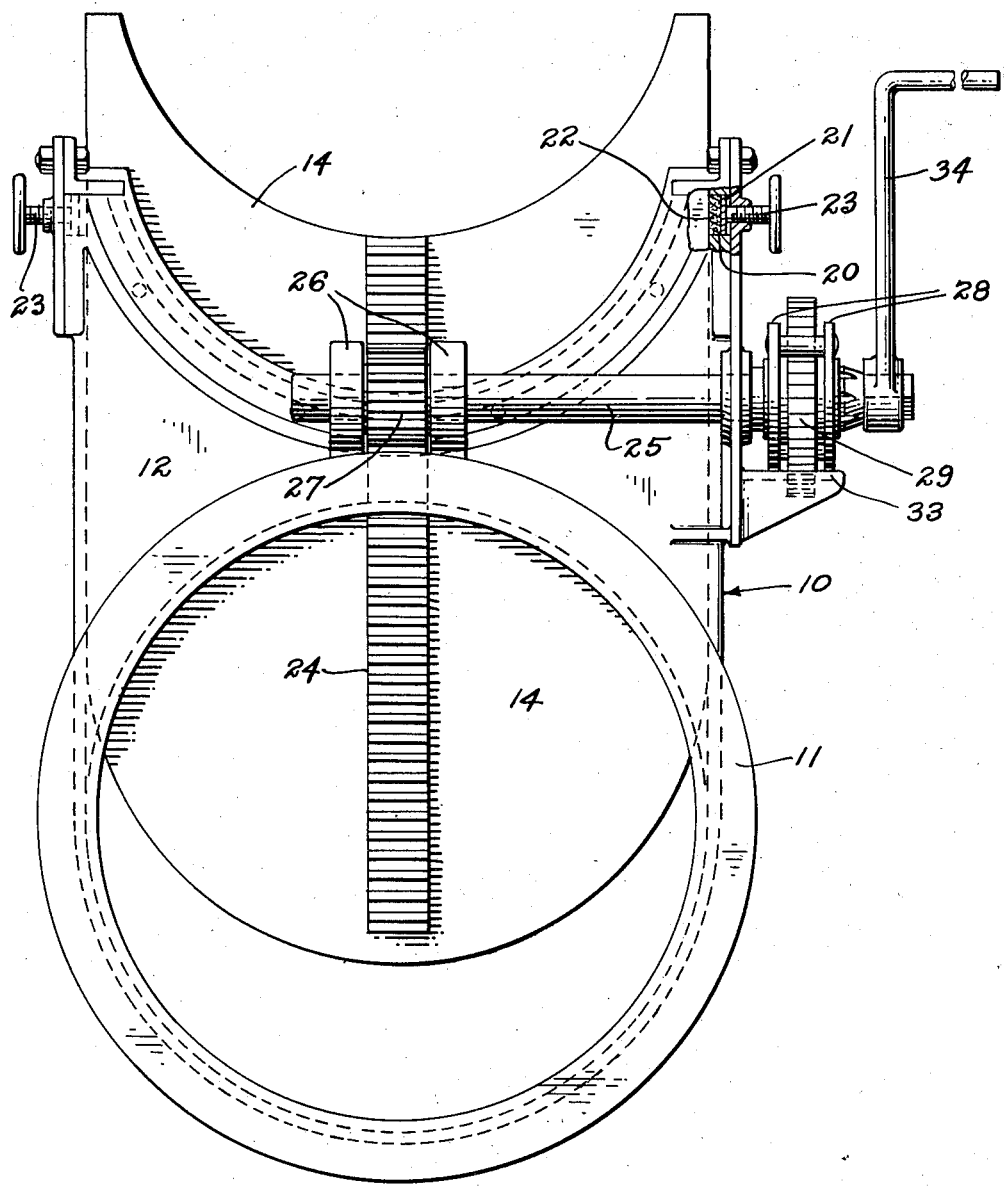

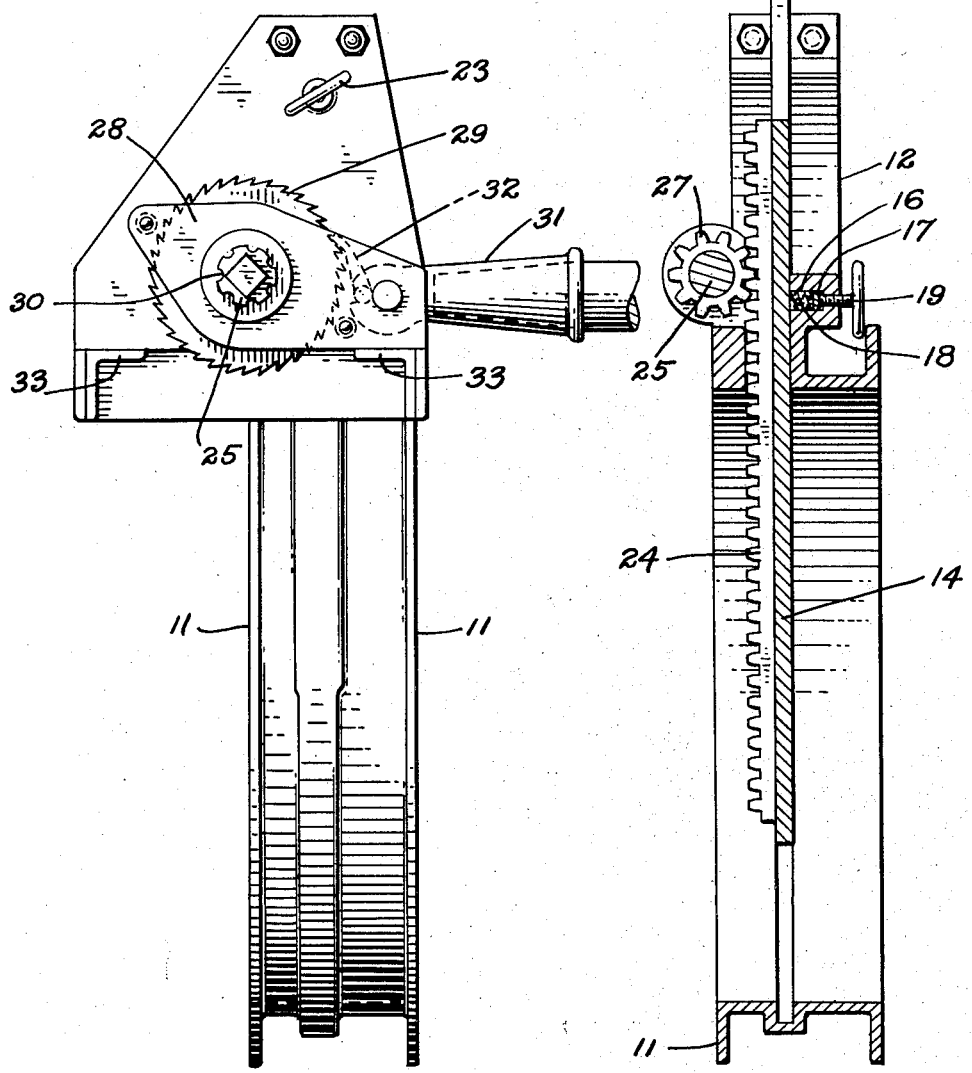

INVENTOR.
Sidney G. Plummer.
BY
Townsend, Loftus + Abbett
ATTORNEYS.

Patented Sept. 18, 1934

1,973,929

UNITED STATES PATENT OFFICE 1,973,929

DREDGER PIPE VALVE

Sidney G. Plummer, Oakland, Calif.

Application September 16, 1931, Serial No. 563,103

1 Claim. (Cl. 251—54)

This invention relates to valves and particularly pertains to gate valves for use in connection with dredger pipe.

It is the principal object of the present invention to provide an improved gate valve for use in connection with dredger pipe or other pipe of comparatively large diameter, which valve is so constructed that it may be expeditiously opened or closed against the pressure of erosive fluid being conveyed through the pipe.

In carrying the invention into practice I provide a valve body adapted to be interposed in the pipe line and mounted within which is a valve member capable of vertical reciprocation. A toothed rack is formed vertically over one face of the valve and is in mesh with a pinion which is connected with an operating mechanism so designed that the valve may be rapidly opened or closed against the pressure in the line.

One form which the invention may assume is exemplified in the following description and illustrated by way of example in the accompanying drawings, in which:

Fig. 1 is a view in elevation of a valve embodying the preferred form of my invention showing the valve partly open.

Fig. 2 is a view in side elevation of the valve structure.

Fig. 3 is a view in vertical section through the valve.

Figure 4:
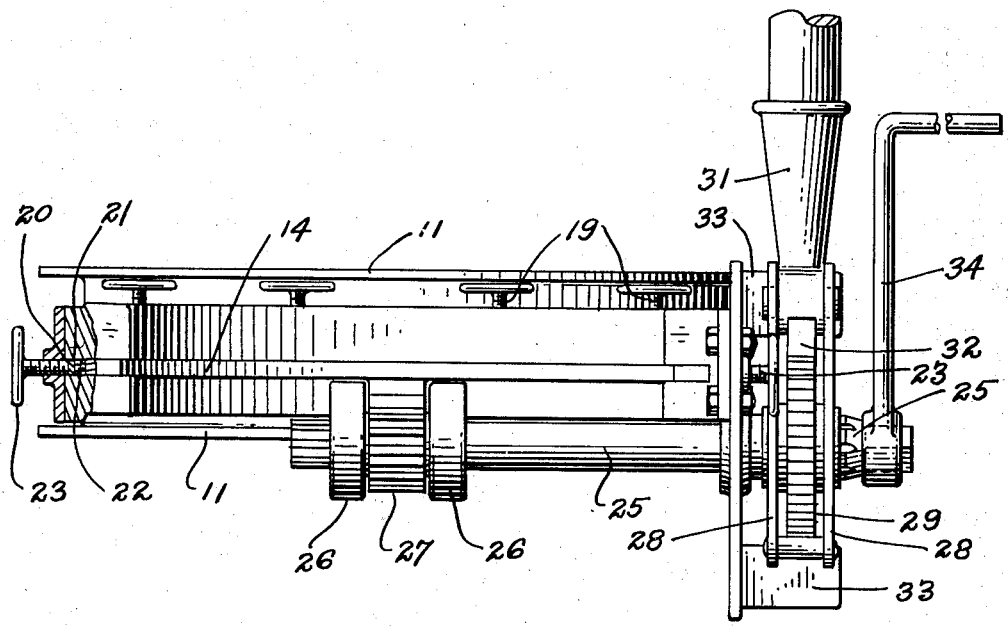
Fig. 4 is a view in plan of the valve with parts thereof in section.

Referring more particularly to the accompanying drawings, 10 indicates a valve body including a cylindrical section 11 of an interior diameter agreeing with the interior diameter of the pipe line in which it is adapted to be interposed. The opposite ends of the cylindrical portion 11 of the valve body are flanged for connection with the flanges of the adjacent ends of the pipe line.

The valve body is also formed with a valve guide portion 12 projecting vertically from the cylindrical portion. This guide portion is formed with a vertical chamber of a cross sectional area sufficient to reciprocably receive a flat valve member 14. The valve chamber mentioned extends through the upper half of the cylindrical portion 11 of the valve body to enable the valve member 14 to be positioned to form a closure centrally of the cylindrical portion and thereby interrupt the flow of fluid therethrough.

The chamber in the guide portion 12 is of a slightly greater width than the interior diameter of the cylindrical portion 11 so that the valve member 14 will likewise be slightly greater in dimensions than this bore of the cylindrical portion. It will be noticed that the lower end of the valve member 14 is semi-circular but formed on a radius slightly greater than the radius on which the bore of the cylindrical portion 11 is formed. For this reason the lower half of the cylindrical portion 11 is formed with a channel, the ends of which register with the sides of the chamber in the guide portion 12. The longitudinal dimension of the chamber and the channel is just sufficient to slidably receive the valve member 14. When the valve member is in closed position its marginal edges project within the channel to effect a closure of the bore through the cylindrical portion 11.

The upper end of the guide portion 12 of the valve body is cut-away between its opposite sides on a radius emanating from a point located centrally between said sides. This effects a reduction in weight of the valve assembly.

The wall of the valve body at the pressure side of the valve member is formed with a packing groove 16, which groove is closely adjacent to and parallels the upper arcuate end of the guide portion of the valve body. A metallic packing bar 17 is loosely disposed in this groove and suitable packing 18 is interposed between the packing bar and the adjacent surface of the valve member. Packing screws 19 are threaded through the wall of the guide portion of the valve body in alignment with the packing groove. The inner ends of these packing screws are adapted to engage the packing bar 16 so as to force the same inwardly and tightly press the packing against the surface of the valve member 14.

Packing is also provided at the opposite side edges of the valve member at a point closely adjacent to the upper end of the guide portion of the valve body. At this point vertical recesses 20 are formed in the guide portion in register with the side edges of the valve member 14. Arranged in each recess is a packing bar 21 and interposed between the packing bars and the adjacent edges of the valve member 14 is packing 22. Packing screws 23 are threaded through the sides of the guide portion of the valve body to engage the packing bars 21 so that the latter may be moved inwardly through the medium of the screws and tightly press the packing against the side edges of the valve member. This prevents leakage upwardly through the guide portion 12 between the edges of the valve member 14 and the valve body.

To operate the valve member 14 so as to move the same to open or closed position a toothed rack 24 is provided and arranged vertically over one face of the valve member 14 centrally thereof and secured in this position to the valve member 14 in any preferred manner. It will be noticed that the rack 24 is arranged on the side of the valve member opposite the pressure side. The valve body is suitably apertured to accommodate the rack 24.

Arranged at the exterior of the valve body just above the cylindrical portion 12 is a horizontally disposed operating shaft 25 which is journalled at its inner ends in two spaced bearing lugs 26 which are arranged at opposite sides of the rack 24 and at opposite sides of a recess formed in the guide portion 12 of the valve body. Secured on the shaft 25 intermediate the bearing lugs 26 is a pinion 27 which projects through the aperture in the guide portion 12 and into mesh with the rack 24 so that upon rotation of the shaft 25 vertical movement will be imparted to the valve member 14. The movement of the valve member 14 may be in either direction depending, of course, upon the direction of rotation of the shaft 25.

Due to the character of the material conveyed through dredger pipes, the pressure of the fluid and the large diameter of dredger pipe, considerable force is required to open and close valves of the character herein disclosed. Therefore, for the purpose of enabling the valve member 14 to be comparatively rapidly opened and closed I have provided a ratchet type of operating mechanism for revolving the shaft 25. This ratchet type of operating mechanism is such that it may be used to either open or close the valve against pressure.

This mechanism consists of a pair of relatively fixed plates 28 which are spaced apart. Interposed between these plates and having its hubs revoluble therein is a ratchet wheel 29. This ratchet wheel 29 is formed with a fluted bore 30 which coincides with a fluted portion formed adjacent the outer end of the shaft 25. Pivotally mounted between these plates at one side of the ratchet wheel and adjacent its perimeter is a fulcrum lever 31 the inner end of which carries a pivotal pawl 32 to engage the teeth of the ratchet wheel 29. The valve body is fitted with a pair of projecting pads 33 on a lower plane than the shaft 25 and against which one end of the plates 28 may bear.

Reference being had to Fig. 2 it will be seen that upon oscillation of the fulcrum or operating lever 31 that the ratchet wheel 29 will be turned continuously in one direction so as to vertically move the valve member 14.

If it is desired to move the valve member in the opposite direction, the operating assembly including the plates 28, the ratchet wheel 29 and the operating lever 31 is slipped off the shaft 25 and reversed. This places the ends of the plates 28 in engagement with the opposite pad 33 so that upon oscillation of the lever the ratchet wheel will be revolved in the opposite direction to turn the shaft and thereby operate the valve member.

It is obvious that through the leverage acquired that the valve member 14 may be operated against tremendous pressure and rapidly opened or closed.

If there is no pressure in the line and it is desired to more rapidly open or close the valve, I have provided a crank 34 which may be removably fitted to the squared end of the shaft 25 so as to rapidly revolve the same in either direction to open or close the valve.

In operation of the device, it is constructed and assembled substantially as shown in the drawings and interposed in a pipe line with the opposite flanges of the cylindrical portion 11 tightly bolted to the matched flanges of the pipe sections.

If it is desired to open the valve member prior to the passage of fluid through the pipe line, the crank 34 is fitted to the end of the shaft 25 and the latter revolved in a direction opening the valve.

To close the valve against the pressure the operating assembly is fitted to the end of the shaft in a position whereby oscillation of the operating lever 31 will revolve the ratchet wheel 29 in a direction closing the valve.

To open the valve against the pressure the operating assembly is slipped off the end of the shaft 25 and reversed so that operation of the operating lever 31 will revolve the ratchet 29 in the opposite direction and open the valve through the medium of the shaft 25, the pinion 27 and the rack 24.

From the foregoing it is obvious that I have provided a comparatively simple and inexpensive valve for dredger pipe which is particularly applicable for use in connection with pipes of large diameter, the construction of the valve being such that it will be comparatively light in weight, easily operated and comparatively inexpensive to construct.

While I have shown the preferred form of my invention, it is to be understood that various changes may be made in its construction by those skilled in the art without departing from the spirit of the invention as defined in the appended claim.

Having thus described my invention, what I claim and desire to secure by Letters Patent is:

A valve of the character described comprising a valve body having a cylindrical portion with a bore formed therethrough, a guide portion extending radially from said cylindrical portion, the upper end of the guide portion being arcuately cut-away, a flat valve member cut-away at one end to coincide with the cut-away guide portion, the other end of the valve member being semi-circular to conform with the bore in the cylindrical portion, said valve member being reciprocably mounted in the valve body, packing means about the upper perimeter of the guide portion at one side of the valve member, packing means at the opposite side edges of the guide portion and valve member, said packing means constituting a groove formed in the guide member contiguous to the adjacent surface of the valve member, a packing bar loosely disposed in said groove, packing interposed between said bar and the adjacent surface of the valve member, means for urging said bar toward the adjacent surface of the valve member to press the packing into firm contact therewith, a rack secured across one face of the valve member in alignment with the guide portion, an aperture in the guide portion adjacent the bore of the cylindrical portion and through which said rack is accessible, a shaft arranged transversely of the guide portion and rotatably supported thereby, a pinion secured on said shaft and projecting through said aperture into mesh with the rack, reversible operating means for operating said shaft to cause opening and closing of the valve through the medium of the rack and pinion, said operating mechanism comprising a ratchet wheel removably but non-rotatably mounted on the shaft, an oscillatory lever having a pawl engaging said ratchet wheel, and members operatively associated with the ratchet wheel and said lever whereby the same may be removed from the shaft and reversed.

SIDNEY G. PLUMMER.